Nov. 14, 1961 W. G. PFANN 3,009,126
STRAIN TRANSDUCERS
Filed June 7, 1960 3 Sheets-Sheet 1

INVENTOR
W. G. PFANN
BY
*George S. Indig*
ATTORNEY

Nov. 14, 1961 W. G. PFANN 3,009,126
STRAIN TRANSDUCERS
Filed June 7, 1960 3 Sheets-Sheet 3

INVENTOR
W. G. PFANN
BY
ATTORNEY

United States Patent Office
3,009,126
Patented Nov. 14, 1961

3,009,126
STRAIN TRANSDUCERS
William G. Pfann, Far Hills, N.J., assignor to Bell Telephone Laboratories, Incorporated, New York, N.Y., a corporation of New York
Filed June 7, 1960, Ser. No. 34,484
10 Claims. (Cl. 338—5)

This invention relates to strain transducers. Specifically, it concerns the measurement of linear strains occurring between two points through the use of a translating device designed to concentrate the strain in a small area. This strain magnification by a simple yet effective means allows the use of novel and highly sensitive means for measuring the concentrated strain. The strain magnification obtainable using this invention provides for a sensitive strain detector having but a fraction of the linear dimension of the strain magnifying devices of the prior art.

In recent years a demand has arisen for strain detectors of sufficient sensitivity to measure strains of the order of $10^{-9}$ or less, particularly in connection with seismic studies. Since linear directional strain seismographs increase in sensitivity as a function of the length of separation of the reference points, such sensitive instruments require lengths of many meters. Linear strain seismographs are discussed in "Seismographs" by H. Benioff appearing in vol. 2 of Advances in Geophysics (1955). A particular installation described by Benioff capable of detecting a strain of $4 \times 10^{-9}$ is 24 meters long. A device constructed according to the principle of this invention is capable of measuring at least this small strain while having a longest dimension of less than one meter.

The strain transducer according to this invention makes use of a duplex column. Such a column is so designed as to concentrate the strain appearing between two points into a dimension smaller than the linear dimension between those points. The strain appearing in the concentrated section is thereby a magnification of the strain between the two reference points.

Consider a cylindrical column having another cylindrical column smaller in diameter joined end to end with a common axis. An axial strain applied to the entire column produces a larger strain in the small column than that appearing in the large column. This magnification of the strain in the small column is essentially the ratio of areas of the two columns. Now if the axial dimensions are varied such that the large column predominates over most of the total length of the columns, the strain appearing in the small column is further magnified by a factor equal to the ratio of the lengths.

A further magnification or concentration of strain in the small column can be effected by utilizing a material for the small column which has a smaller elastic modulus than the material of the large column. This additional magnification is essentially equal to the ratio of the elastic moduli.

The remarks can perhaps be better understood when considered in conjunction with the drawings in which.

Figure 1:
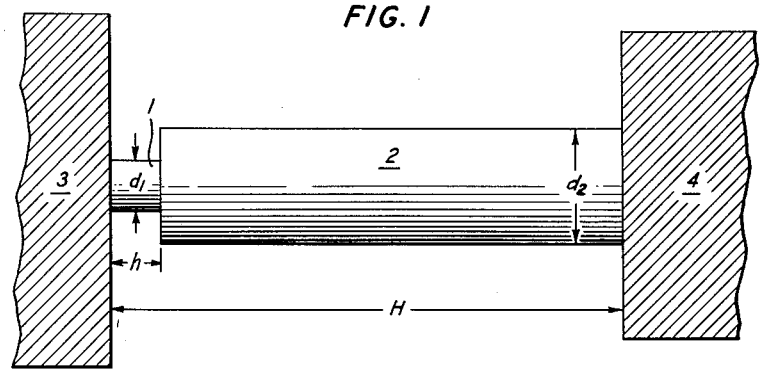
FIG. 1 is a front elevation of a typical duplex column interposed between bearing plates and having dimensions as represented by the symbols which will become useful in considering the equations to follow.

Considering FIG. 1, a duplex column is shown consisting of a cylindrical column 2 having a smaller column 1 aligned axially and adjacent to one end thereof. Numerals 3 and 4 indicate bearing members abutting both ends of the duplex column. Using the dimensions as represented by the symbols of FIG. 1, the strain magnification appearing in the small column 1 can be derived as follows:

A given axial compressive strain $\epsilon_0$ between the bearing members 3 and 4 will produce a pressure $p$ in the column. The relative displacement $\Delta H_p$ of the end faces of the duplex column is:

$$\Delta H_p = \frac{p}{E_1}\left[h + \frac{d_1^2 E_1}{d_2^2 E_2}(H-h) + (1-\nu^2)d_1\frac{E_1}{E_2}\right] \quad (1)$$

where $E_1$ and $E_2$ denote the elastic modulus of the small column and the large column, respectively, $\nu$ denotes Poisson's ratio. The first two terms on the right represent the axial compression of the small and large columns. The third represents the distance the small column sinks into the large column.

An equal pressure, $p$, is exerted on the face of the bearing column 1, producing a displacement, $\Delta Y_p$, given by:

$$\Delta Y_p \cong (1-\nu^2)d_1 \cdot \frac{p}{E_0} \cong (1-\nu_0^2)d_1\epsilon_1 \cdot \frac{E_1}{E_0} \quad (2)$$

where $\epsilon_1$ is the elastic strain in column 1; $E_0$ and $\nu_0$ are the elastic modulus and Poisson's ratio for the bearing members. (The amount the large column presses into the bearing face is negligible if $d_2 \gg d_1$, which is assumed.)

The relation governing the displacements in (1) and (2) is:

$$\Delta H = \Delta H_p + \Delta Y_p$$

where $\Delta H = \epsilon_0 H$. From (1) to (3), the strain magnification $M_c \equiv (\epsilon_1/\epsilon_0)$ is:

$$M_c \cong \frac{H}{h + \frac{d_1^2 E_1}{d_2^2 E_2}(H) + d_1\left[(1-\nu^2)\frac{E_1}{E_2} + (1-\nu_0^2)\frac{E_1}{E_0}\right]} \quad (4)$$

(We assume $H \gg D$ and $(H-h) = H$, and note that $\epsilon_1 = p/E_1$.)

The strain appearing in column 1 is $M_c\epsilon_0$. Considering that a small overall length H is desired, large magnifications are favored by small values of $h$, $d_1$, $E_1/E_2$, and $E_1/E_0$. Assume, for instance, that $h=0.1$ cm. and $d_1=0.2$ cm. Modulus ratios $E_1/E_2$ and $E_1/E_0$ of $\sim 0.1$. can be achieved by using a low modulus metal, such as aluminum, tin, lead or magnesium for column 1 and a high modulus metal such as molybdenum for column 2. A plate of molybdenum inserted in the cavity face at the end of column 1 makes $E_0$ equivalent to $E_2$. Poisson's ratio for these materials is approximately 0.3. Using these values, Equation 4 reduces to:

$$M_c \cong \frac{7H}{1+0.029\left(\frac{H}{d_2^2}\right)} \quad (5)$$

where H and $d_2$ are in cm.

Figure 2:
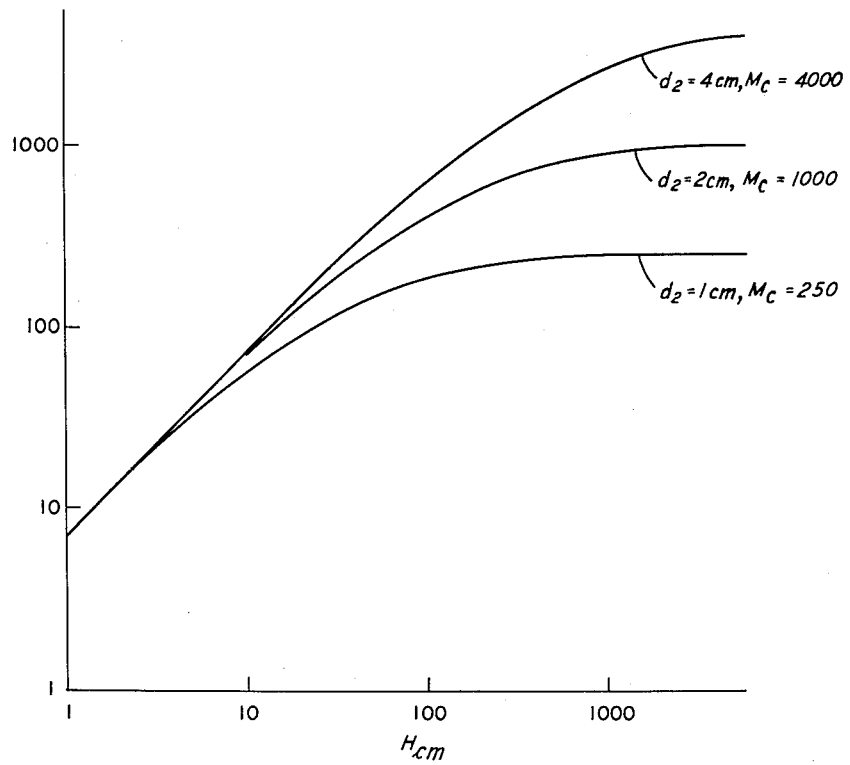
FIG. 2 is a plot of the length of the duplex column versus the magnification obtainable which has separate curves representing various appropriate values of the diameter of the larger column.

A plot of $M_c$ versus H for a few values of $d_2$ is shown in FIG. 2. It shows that $M_c$ increases approximately as H at small values of H but levels off at $d_2^2/0.004$ at large H. It is seen that magnifications of, for instance, 1000 are easily obtained using, for example, $d_1=3$ cm. and $H=2.5$ meters.

Whereas the column has been discussed and shown as having a cylindrical cross-section, it is obvious that columns having rectangular, square, or polygonal cross-sections would also be effective. Also, the two sections may be axially aligned; however, this also is not an essential requirement. A hollow column may be utilized as long as it possesses the necessary strength.

As previously explained and as is obvious from the equations, there are essentially three variables important to the magnification value. These are the ratio of the axial lengths $H/h$, the ratio of the diameters $d_2/d_1$, and the ratio of the elastic moduli $E_2/E_1$ (and to a lesser degree $E_0/E_1$). It is apparent that very favorable choice of two of these variables will permit a greater latitude for the third. Consequently, one variable may depart from the preferred range if the other two are very favorably selected. Since a purpose of this invention is strain magnification, any duplex column having a structure with a combination of the variables as previously set forth which results in a magnification of a strain impressed across its ends exceeding 100 in value is intended to be within the scope of this invention. This value of 100 is chosen as a magnitude at which strain magnifications are considered significant in practical applications such as seismology.

However, certain prescribed ranges for the variables are preferred in order to obtain magnifications of the desired magnitude. These ranges, in the form of ratios, are $$\frac{E_1}{E_2} < 1$$

and preferably $<.5$, $$\frac{d_1}{d_2} < .5$$

and preferably $<.2$ and $$\frac{H}{h} > 100$$

and preferably $>500$.

A further feature of this invention concerns the strain transducer for measuring the concentrated strain appearing in the small section of the duplex column. The size requirements for this transducer are very demanding since both small cross-section and small length are desired of the member 1. The transducers according to this invention are bonded-metal resistance strain gauges, tunnel diode transducers and piezoresistive transducers. Considering first the bonded-metal resistance strain gauge, such devices are available having the small dimensions required in the previous equations. They are durable, dependable, and economical. Most significant is the fact that they are capable of measuring strains of the order of $10^{-6}$. The combination of a resistance strain gauge with the duplex column 2.5 meters in length proposed previously as providing for a strain magnification of 1000, will afford a strain magnification of $10^9$. As stated previously, a typical linear strain seismograph of the prior art which is capable of such sensitive strain detection is over 24 meters long.

Figure 3:
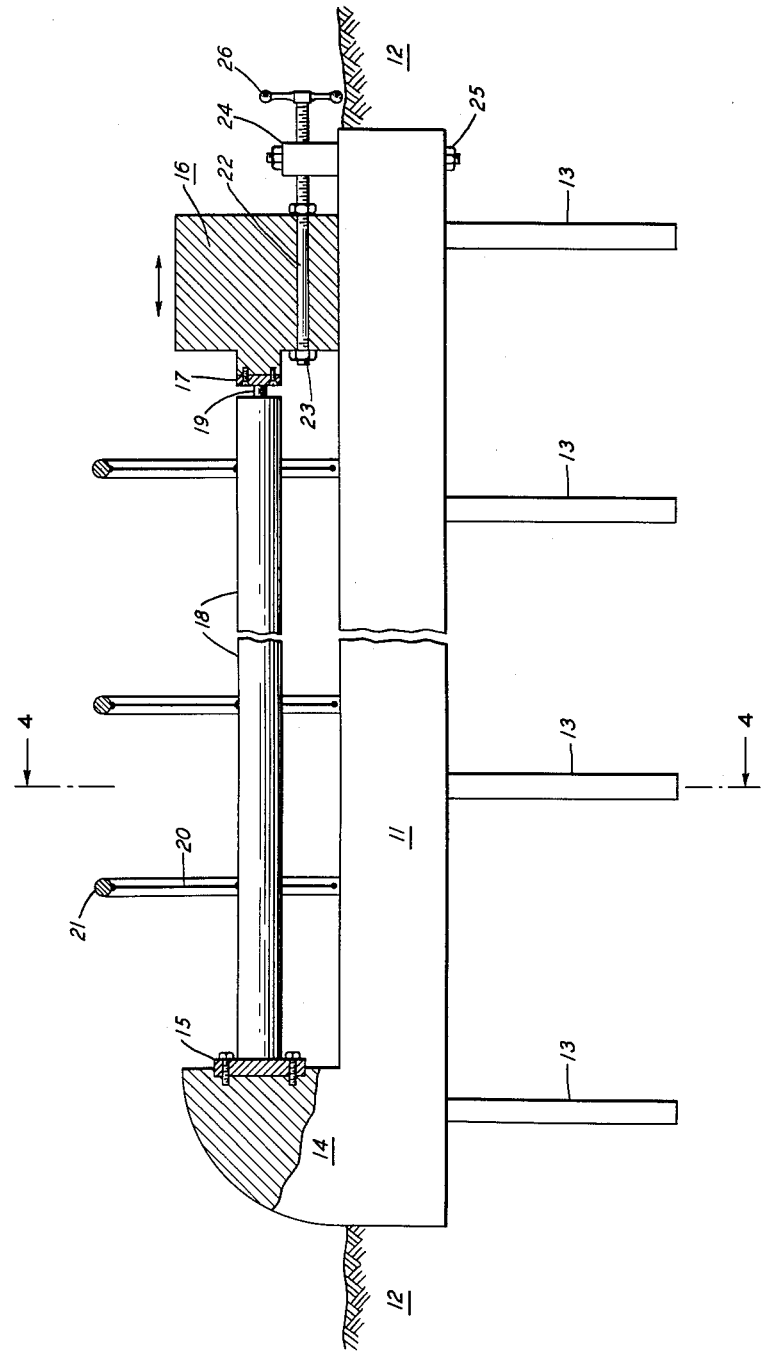
FIG. 3 is a front sectional view of a typical seismograph installation using a duplex column similar to that of FIG. 1.
Figure 4:
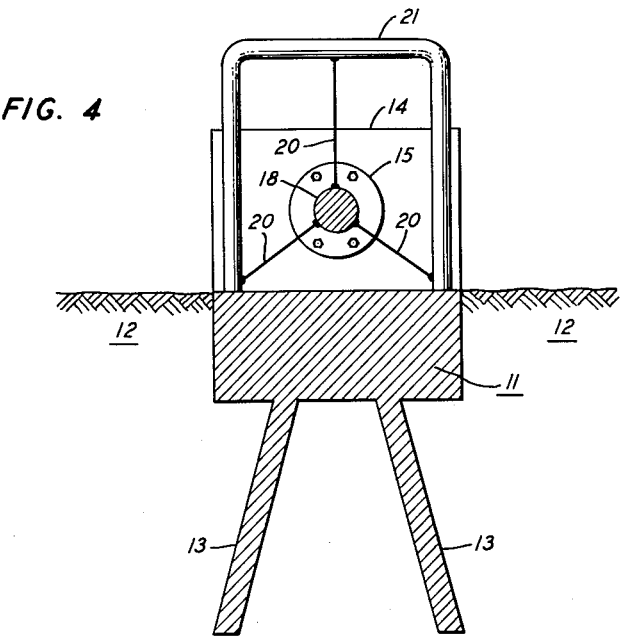
FIG. 4 is a side section of FIG. 3 through the plane 4—4.

FIG. 3 shows a typical seismograph installation using a duplex column in combination with a strain transducer, for instance, a resistance strain gauge. In the figure, 11 denotes a steel base imbedded in earth or rock 12 with the aid of anchoring means 13. The base may be imbedded in concrete or other appropriate supporting medium and then imbedded in a rock cavity. The base may also be of other materials as long as the elastic modulus of the base is comparable to that of the medium in which it is imbedded. At one end of the base is an abutment 14 carrying a bearing plate 15 bolted or suitably attached to the abutment. At the other end of the base is another abutment member 16 which also carries a bearing plate 17 bolted to a protrusion on the abutment. The members 14 and 16 are preferably of the same material as the base member. The bearing plates 15 and 17 are of a material having a high elastic modulus, for instance molybdenum. Between the members 14 and 16 is a duplex column, similar to that shown in FIG. 1, having a large column 18 and a small column or strain transducer 19. The column is supported between the bearing plates by wires 20 attached to support bars 21. Abutment 16 is made so as to enable delicate adjustment between the transducer 19 and the bearing plate 17. The adjustment means may take the form shown which has a pin 22 attached through the abutment by bolt 23 and threaded at one end to engage the threaded support 24. The support 24 is attached firmly to the base by tie rods terminating at bolts 25. A handle 26 is provided to operate the adjuster. The abutment 16 is preferably mounted on an appropriate track or frictionless surface (not shown) to facilitate lateral movement. FIG. 4 is a sectional side elevation through plane 4—4, showing the anchoring members 13, and the support means 20 and 21 in better perspective.

Figure 5:
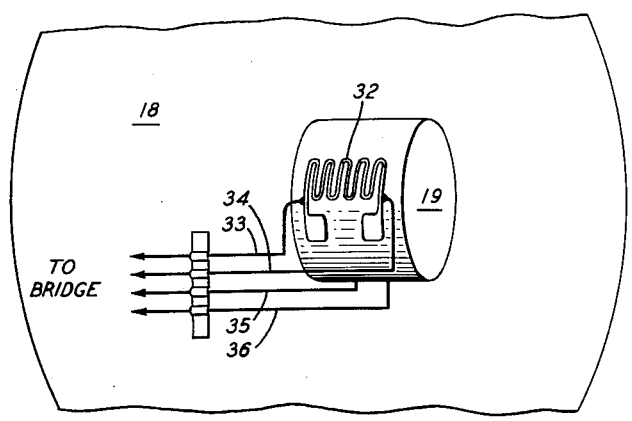
FIG. 5 is a perspective view showing in detail an appropriate strain transducer attached to the small column of FIG. 3.

FIG. 5 shows an appropriate strain gauge transducer of the type previously discussed and shown at 19 in FIG. 3. Numeral 18 denotes the end face of the large column. Mounted on the small column 19 are two bonded metal strain gauges, one of which can be seen at 32, the other is mounted on the hidden side of member 19. Emanating from each gauge are two wires, 33, 34 and 35, 36, respectively, which lead to a standard Wheatstone bridge circuit. The bridge circuit is arranged so that the changes in resistance of the two gauges are additive and the galvanometer reads the total change. To this end the gauges are disposed in two legs of the bridge which are no the same potential side.

The particular type of strain gauge used may be any of the commercially available gauges having the required sensitivity and size. Particularly adapted to this apparatus are two gauges manufactured by the Instruments Division of The Budd Company designated C6–1X1–32 and C6–1X1–64.

Another attractive and effective transducer for measuring strains in small member 19 is a tunnel diode. Pressure measurement using tunnel diodes is a recent development which is the subject matter of copending application Serial No. 28,047 by W. G. Pfann entitled "Pressure Transducers," filed May 11, 1960. In that application, it was shown that a germanium tunnel diode of a specified type showed a $\Delta V/V$ of 15% or .15, when subjected to a pressure change of 1000 atmospheres. The gauge factor of this transducer can be calculated as follows:

$$\text{gauge factor} = \frac{\frac{\Delta V}{V}}{\epsilon} \quad (6)$$

where $\Delta V$ is change in voltage at constant current, V is initial or starting voltage, and $\epsilon$ is the strain. The strain is calculated from:

$$\epsilon = \frac{p}{E} \quad (7)$$

where $p$ is the pressure in dynes/cm.$^2$ and $\epsilon$ is Young's modulus (for germanium).

$$\epsilon = \frac{10^9 \text{ dynes/cm.}^2}{1.3 \cdot 10^{12} \text{ dynes/cm.}^2}$$
$$= 7.7 \cdot 10^{-4}$$

From Equation 6 the gauge factor for a tunnel diode is obtained:

$$\text{gauge factor} = \frac{.15}{7.7 \cdot 10^{-4}}$$
$$\cong 193$$

Since the typical gauge factor of resistance strain gauges is about 2, it is readily apparent that the use of tunnel diodes as strain transducers results in a further magnification of two orders of magnitude permitting a device 2.5 meters in length to measure strains of about $10^{-11}$.

A further refinement on strain transducers using a tunnel diode is readily obtained by further diminishing the size of column 1 (FIG. 1) with respect to column 2. This is possible since tunnel diodes can be constructed whose critical regions have a length of 0.002 cm. and a width (or diameter) of 0.002 cm. If in the duplex column a tunnel diode is used as the small member 1, then in Equation 4 $h=0.002$ cm. and $d_1=0.002$ cm. If the tunnel diode is germanium and the column 2 is molybdenum, the $$\frac{E_1}{E_2}=0.3$$

Assuming again a Poisson's ratio of 0.3:

$$M_c \cong \frac{H}{h+\frac{d_1^2 E_1}{d_2^2 E_2}(H)+d_1\left[(1-\nu_2^2)\frac{E_1}{E_2}+(1-\nu_0^2)\frac{E_1}{E_0}\right]}$$

$$\cong \frac{H}{.00308+1.2\cdot10^{-7}\left(\frac{H}{d_2^2}\right)}$$

For a typical $d_2=3$ cm., a magnification of 1000 which when using the larger dimensions required by resistance strain gauges required a length H of 2.5 meters is obtainable when using the dimensions of a tunnel diode with a column length $H\cong 3.1$ cm.

Since the bulk resistivity (piezoresistive effect) of a tunnel diode varies with pressure by the same order of magnitude as the tunnel current, piezoresistive gauges are effective in the same general manner as the tunnel diodes based on variation in tunneling probability. These piezoresistive pressure transducers are known in the art. See, for instance, Journal of the Acoustical Society of America, volume 29, pages 1096–1101, October 1957.

Further strain magnifications may be provided through the particular use of cavities having specific designs which are fully explained in applicant's copending application Serial No. 33,225, filed June 1, 1960, and entitled "Elastic Strain Transducers."

A device constructed according to this invention will provide a strain detection apparatus at least as sensitive as the best prior art devices while having only a fraction of the size. While this disclosure has been framed in terms of seismic devices, it is obvious that such sensitive and relatively small strain gauges will find widespread applications in other areas. The application of this device to other strain measurements is considered to be within the scope and spirit of this invention.

What is claimed is:
1. An apparatus for measuring strains which comprises a duplex column having a first axial section and a second axial section, said first section having with respect to said second section a ratio of cross-sectional areas greater than 5, a ratio of lengths greater than 500, and a ratio of elastic moduli greater than 2, and means associated with said second section for measuring strain therein.
2. The apparatus of claim 1 wherein the column is suspended between bearing members imbedded in an elastic medium whereby longitudinal strains appearing in the medium are measured.
3. The apparatus of claim 1 wherein said strain measuring means comprises a bonded-metal resistance type strain gauge.
4. The apparatus of claim 1 wherein the strain measuring means are two bonded-metal resistance type strain gauges disposed in separate arms of the same potential side of a Wheatstone bridge whereby the total change in resistance of both gauges due to strain is determined.
5. The apparatus of claim 1 wherein the second section comprises a tunnel diode pressure transducer for measuring strain.
6. The apparatus of claim 1 wherein the second section comprises a piezoresistive pressure transducer for measuring strain.
7. The apparatus of claim 1 wherein the longest dimension of the column does not exceed 2.5 meters in length.
8. The apparatus of claim 2 wherein the medium is earth.
9. The apparatus of claim 5 wherein the tunnel diode is a germanium tunnel diode.
10. An apparatus for measuring strains which comprises a duplex column having a first axial cylindrical section consisting essentially of molybdenum, and a second axial section consisting essentially of a metal selected from the group consisting of aluminum, tin, lead, and magnesium, said first section having with respect to said second section a ratio of cross-sectional areas greater than 5, a ratio of lengths greater than 500, and a ratio of elastic moduli greater than 2, and means associated with said second section for measuring strain therein.

References Cited in the file of this patent
UNITED STATES PATENTS

| | | |
|---|---|---|
| 2,558,563 | Janssen | June 26, 1951 |
| 2,599,578 | Obert et al. | June 10, 1952 |
| 2,722,587 | Buzzetti et al. | Nov. 1, 1955 |
| 2,775,887 | Hines | Jan. 1, 1957 |
| 2,840,675 | Di Giovanni | Jan. 24, 1958 |